J. MARSHALL.
GRAIN SAVING DEVICE.
APPLICATION FILED NOV. 24, 1909.

956,591.

Patented May 3, 1910.
2 SHEETS—SHEET 1.

Witnesses
W. H. Woodson
Juana M. Fallin

Inventor
John Marshall.
By
Marshaery, Attorneys

J. MARSHALL.
GRAIN SAVING DEVICE.
APPLICATION FILED NOV. 24, 1909.

956,591.

Patented May 3, 1910.
2 SHEETS—SHEET 2.

Witnesses

Inventor
John Marshall.
By
, Attorneys.

UNITED STATES PATENT OFFICE.

JOHN MARSHALL, OF SIBLEY, IOWA.

GRAIN-SAVING DEVICE.

956,591. Specification of Letters Patent. Patented May 3, 1910.

Application filed November 24, 1909. Serial No. 529,792.

*To all whom it may concern:*

Be it known that I, JOHN MARSHALL, a citizen of the United States, residing at Sibley, in the county of Osceola and State of Iowa, have invented certain new and useful Improvements in Grain-Saving Devices, of which the following is a specification.

This invention relates to threshing machines and more particularly to means for catching and saving the waste grain thrown off from the straw as the latter enters the blower fan of a grain separator.

The object of the invention is to provide a plate or deflector having one end extending partially across the eye or opening in the fan casing and its opposite end communicating with a return elevator so that the grain dislodged from the straw by the action of the fan will be deflected by said plate into the elevator and returned to the threshing cylinder.

A still further object of the invention is generally to improve this class of devices so as to increase their utility, durability and efficiency.

Further objects and advantages will appear in the following description, it being understood that various changes in form, proportions and minor details of construction may be resorted to within the scope of the appended claims.

Figure 1:
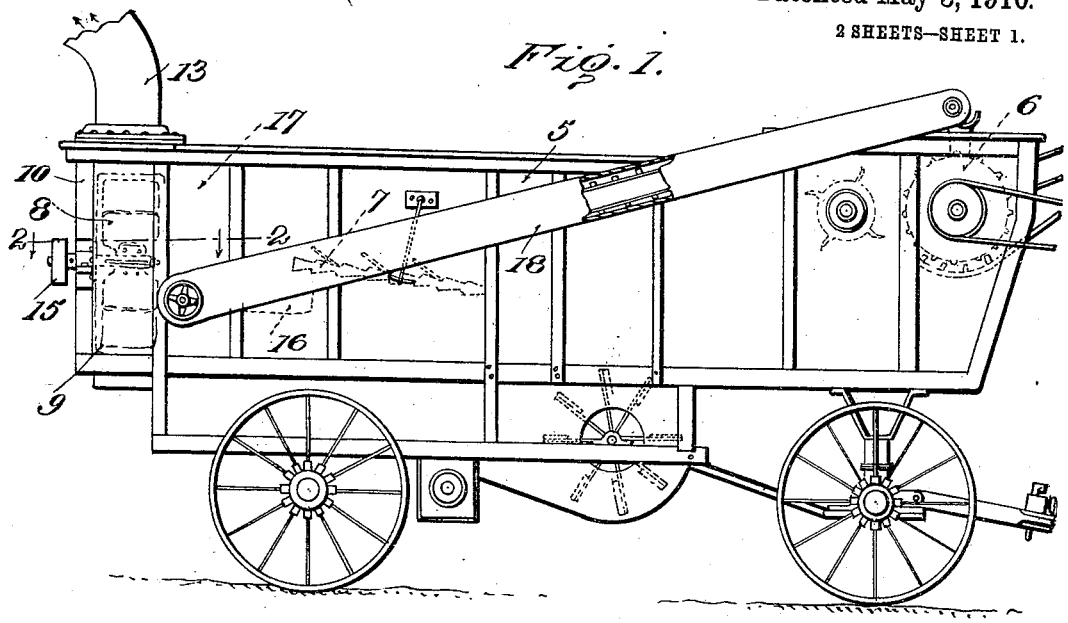
Figure 2:
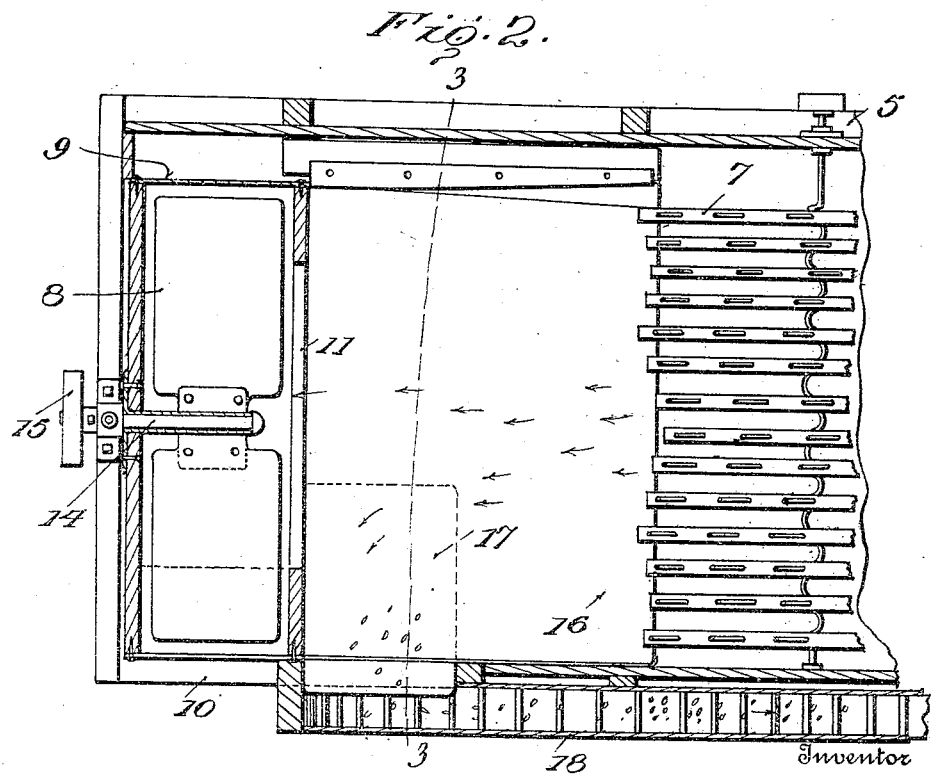
Figure 3:
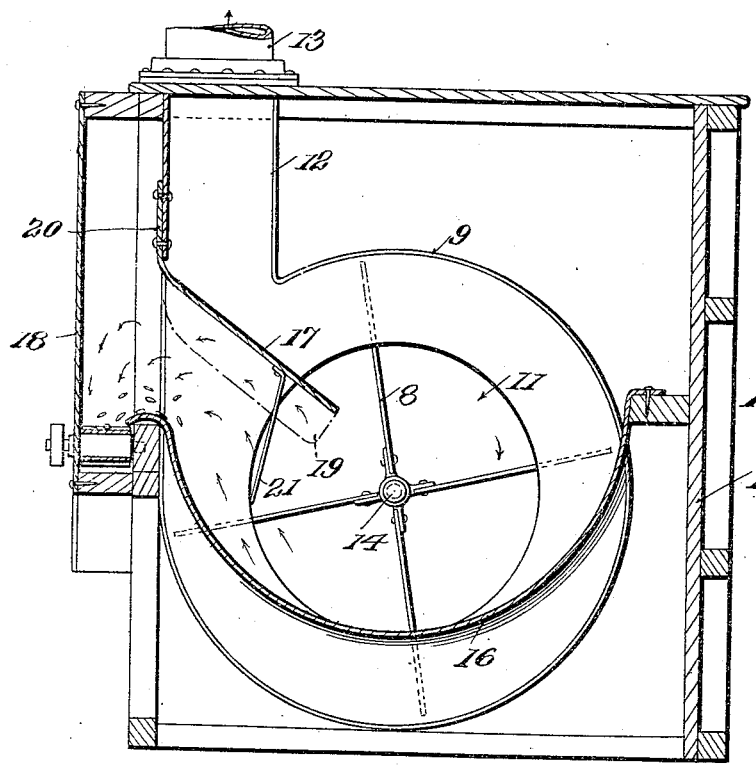
Figure 4:
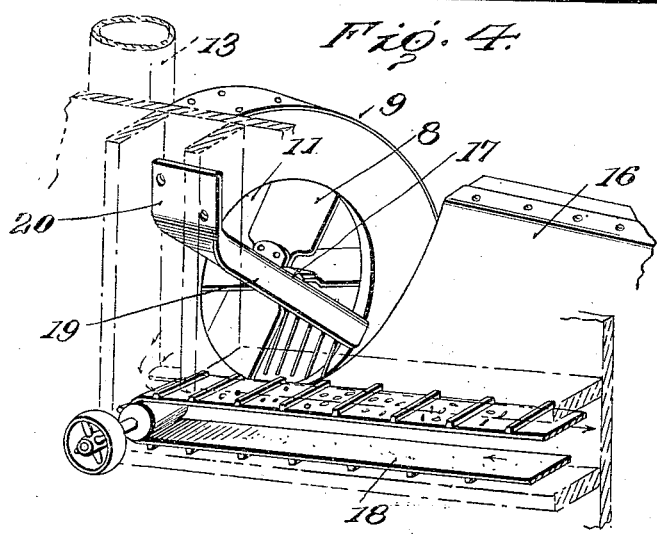
Figure 5:
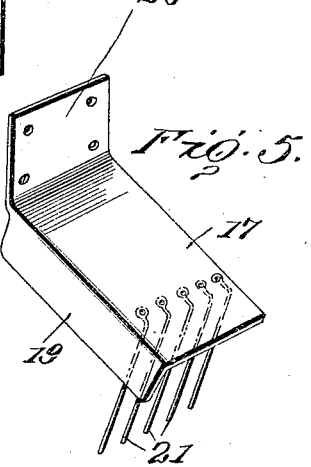

For a full understanding of the invention and the merits thereof and also to acquire a knowledge of the details of construction and the means for effecting the result, reference is to be had to the following description and accompanying drawings, in which:

Figure 1 is a side elevation of a threshing machine provided with a grain saving device constructed in accordance with my invention; Fig. 2 is an enlarged transverse sectional view taken on the line 2—2 of Fig. 1; Fig. 3 is a longitudinal sectional view taken on the line 3—3 of Fig. 2; Fig. 4 is a detail perspective view of the fan showing the deflector in position. Fig. 5 is a perspective view of the plate or deflector detached.

Corresponding and like parts are referred to in the following description and indicated in all the views of the drawings by the same reference characters.

The device forming the subject matter of the present invention is principally designed for use in connection with threshing machines and by way of illustration is shown applied to a threshing machine of the ordinary construction, in which 5 designates the separator frame, 6 the threshing cylinder, and 7 the vibrating forks for feeding the straw to the fan 8. The fan 8 is mounted for rotation in a casing 9, preferably extending across the separator at one end thereof and rigidly secured to an auxiliary frame 10, said fan casing having an eye or opening 11 formed in one side thereof and provided at its upper end with a reduced neck 12 for connection with a stacker conduit or tube 13. The fan 8 is secured to a shaft 14, one end of which projects laterally beyond the adjacent side of the casing and is provided with a pulley 15 for connection with any suitable source of power. Supported on the auxiliary frame 10, is a trough or chute 16 which serves to direct the straw from the forks or feeding devices 7 through the opening 11 in the casing to the fan and thence off through the tube 13 to the stack.

As a means for catching and saving the waste grain dislodged from the straw by the action of the fan as said straw is fed through the eye or opening 11, there is provided a deflector 17, one end of which is extended partially across the eye in the fan casing, while the other end thereof communicates with the interior of a return elevator or conveyer 18 leading to the threshing cylinder 6. The deflector 17 is preferably formed of a single piece of metal having one longitudinal edge thereof bent downwardly to form a depending flange 19 and its upper end bent laterally to form a securing lip 20 for attachment to the auxiliary frame 10. The deflector is preferably disposed at an angle of fifty degrees with one longitudinal edge thereof disposed in contact with the fan casing and with the depending flange 19 spaced from said fan casing so as to form in effect a chute. Thus it will be seen that as the straw is fed through the eye or opening 11, the action of the fan 8 will tend to dislodge any grain adhering to the straw after its passage through the threshing mechanism and throw said grain upwardly. The loose grain thrown off by the fan, coming in contact with the deflector, will be positively directed into the elevator or conveyer 18 and returned to the threshing cylinder, thus effecting a material saving in the grain which would otherwise be lost.

In order to check and screen the straw thrown out by the fan, the deflector is provided with a plurality of depending fingers or wires 21, preferably loosely mounted on the bottom of said deflector in spaced relation to the free edge thereof, as shown.

Having thus described the invention, what is claimed as new is:

1. In a threshing machine, a fan casing having an eye, a conveyer, means for feeding the straw to the fan, and means extending partially across the eye of the fan casing and independent of the fan for directing the grain dislodged from the straw at said fan into the conveyer.

2. In a threshing machine, a fan casing having an eye, a conveyer, means for feeding straw through the eye in the fan casing, and a deflector extending partially across the eye in the fan casing for directing the grain dislodged by the straw into the conveyer.

3. In a threshing machine, a fan casing having an eye, a conveyer, means for feeding the straw through the eye in the fan casing, and a plate having one end thereof extending partially across the eye in the fan casing and its other end extending within the conveyer for positively directing the grain dislodged from the straw into said conveyer.

4. In a threshing machine, a fan casing having an eye, a conveyer extending from the fan casing to the threshing cylinder, means for feeding straw through the eye in the fan casing, and a deflector extending partially across the eye in the fan casing for positively directing the loose grains dislodged from the straw into said conveyer.

5. In a threshing machine, a fan casing having an eye, a conveyer, means for feeding the straw through the eye in the fan casing, and an inclined plate extending from the conveyer casing to the eye in the fan casing and provided with a depending flange for positively directing the grain dislodged from the straw into said conveyer.

6. In a threshing machine, a fan casing having an eye, a conveyer, means for directing the straw through the eye in the fan casing, and an inclined deflector having one end thereof provided with means for attachment to the conveyer casing and its other end extending partially across the eye in the fan casing, said deflector being provided at one longitudinal edge thereof with a depending flange for positively directing the grain dislodged from the straw into the conveyer.

7. In a threshing machine, a fan casing having an eye, a conveyer, means for feeding straw through the eye in the fan casing, a deflector extending partially across the eye in the fan casing for directing the grain dislodged by the straw into the conveyer, and a plurality of fingers depending from said deflector.

In testimony whereof I affix my signature in presence of two witnesses.

JOHN MARSHALL. [L. S.]

Witnesses:
ROBERT E. VOGE,
GERRIT J. ELLERBROCK.